United States Patent
Nochta

(10) Patent No.: US 8,459,550 B2
(45) Date of Patent: Jun. 11, 2013

(54) METHOD FOR TRANSFERRING DATA, A COMPUTER PROGRAM PRODUCT, A DATA PROVISION AND A DATA RECEIVING DEVICE AND A COMMUNICATION SYSTEM

(75) Inventor: Zoltan Nochta, Karlsruhe (DE)

(73) Assignee: SAP AG, Walldorf (DE)

( * ) Notice: Subject to any disclaimer, the term of this patent is extended or adjusted under 35 U.S.C. 154(b) by 708 days.

(21) Appl. No.: 11/347,112

(22) Filed: Feb. 2, 2006

(65) Prior Publication Data

US 2006/0186200 A1 Aug. 24, 2006

(30) Foreign Application Priority Data

Feb. 4, 2005 (EP) ..................................... 05002370

(51) Int. Cl.
*G06K 17/00* (2006.01)

(52) U.S. Cl.
USPC .............................. 235/382; 235/375; 235/380

(58) Field of Classification Search
USPC .................................. 235/380, 382, 383, 375
See application file for complete search history.

(56) References Cited

U.S. PATENT DOCUMENTS

| | | | |
|---|---|---|---|
| 6,130,623 A | 10/2000 | MacLellan et al. | |
| 6,747,546 B1 * | 6/2004 | Hikita et al. | 340/10.31 |
| 6,845,159 B1 | 1/2005 | Domstedt et al. | |
| 2004/0066278 A1 * | 4/2004 | Hughes et al. | 340/10.1 |
| 2004/0158715 A1 | 8/2004 | Peyravian et al. | |
| 2005/0190914 A1 * | 9/2005 | Chen et al. | 380/201 |
| 2005/0261938 A1 * | 11/2005 | Silverbrook et al. | 705/2 |
| 2006/0077034 A1 * | 4/2006 | Hillier | 340/5.61 |

FOREIGN PATENT DOCUMENTS

| | | |
|---|---|---|
| JP | 10145356 A | 5/1998 |
| JP | 2003150881 A | 5/2003 |

OTHER PUBLICATIONS

"Search Report (and Opinion) for European Application No. 05 00 2370", (Aug. 29, 2005), 8 pgs.

Ohkubo, Myako, et al., "Cryptographic Approach to Privacy Friendly Tags", NTT Laboratories, Nippon Telegraph and Telephone Corporation, (2003), 9 pgs.

"Japanese Application Serial No. 2006-015378, Office Action mailed Jan. 5, 2010", 11 pgs.

Ohkubo, Miyako, et al., "Hash-Chain Based Forward-Secure Privacy Protection Scheme for Low-Cost RFID", Symposium on Cryptography and Information Security, (Jan. 2004), 6 pgs.

* cited by examiner

*Primary Examiner* — Michael G Lee
*Assistant Examiner* — Matthew Mikels
(74) *Attorney, Agent, or Firm* — Schwegman Lundberg & Woessner, P.A.

(57) ABSTRACT

The present application relates to a method for transferring data, a computer program product, a data provision device, a data receiving device and a communication system, in particular to authentication/verification of data provided between one or more radio frequency identification reader(s) and one or more radio frequency identification transponder(s). In some embodiments, the method includes an initializing step and a data provisioning step.

23 Claims, 2 Drawing Sheets

METHOD FOR TRANSFERRING DATA, A COMPUTER PROGRAM PRODUCT, A DATA PROVISION AND A DATA RECEIVING DEVICE AND A COMMUNICATION SYSTEM

CLAIM OF PRIORITY

The present patent application claims the priority benefit of the filing date of European Application (EPO) No. 05 002 370.4 filed Feb. 4, 2005, the entire content of which is incorporated herein by reference.

TECHNICAL FIELD

The present application relates to a method for transferring data, a computer program product, a data provision device, a data receiving device and a communication system, in particular to authentication/verification of data provided between one or more radio frequency identification reader(s) and one or more radio frequency identification transponder(s).

BACKGROUND

In many application scenarios using radio frequency identification (RFID) technology data stored on RFID-transponders (RFID-tags) should be protected against unauthorized access. Entities accessing RFID-tags are commonly known as RFID-readers. An RFID-reader can remotely invoke functionality implemented in an RFID-tag via messages sent over the specific radio channel. As an example, RFID-tags can be used in warehouses as an alarm or an anti-theft device. The RFID-tag can be attached to clothes or the like and, when passing a specific detector, e.g. at an exit of the warehouse, an alarm can be triggered, as long as the tag is in an active state.

Moreover, RFID-tags are used in libraries to organize and identify a large variety of books in an easy and fast way. RFID-tags can also be provided as part of a passport, e.g. for storing biometric data of the owner of the passport. Using an RFID-tag instead of plainly writing the biometric data into the passport provides the advantage, that, when encrypted, the data can only be visible to specific people. Moreover, a large variety of data can be stored on the RFID-tag and can also be amended, in case the data change, e.g. additional data have to be stored.

Furthermore, RFID-tags can be used for automatically tracking and identifying people and/or objects. For example, a person could carry an RFID-tag, having a personal identification number stored thereon. When entering and leaving a working space, an automated machine triggers the RFID-tag, reads the personal identification number and stores a entrance/exit time. Following that, the working hours of the person can be easily registered.

Moreover, RFID-tags are used to overview and/or control supply chains. At different institutions of a supply chain, there are provided RFID-readers. When goods, which are labeled with RFID-tags pass by or come within the reach of the respective RFID-reader, the labeled good can be recognized due to communication between the RFID-tag and the RFID-reader. Surveying the process-way or the delivery of goods labeled with RFID-tags can thus be easily obtained.

Further, disposable identification items, such as entrance tickets can be equipped with RFID-tags. For example, entrance tickets, allowing entrance to a football stadium can be equipped with an RFID-tag, which contains data relating to the person owning the ticket. Thus selling fake tickets or reselling tickets on the black market is difficult.

Conventionally, the RFID-reader can be used to access the RFID-tag. The RFID-reader can transmit message data, which might include key words or software code or programs, in order to e.g. deactivate the RFID-tag. Moreover, the RFID-reader can be used to create, read, modify or delete data stored on the RFID-tag. Following that, avoiding unauthorized access to the RFID-tag is very important.

It is common knowledge, to provide a secure communication between two devices by encrypting e.g. the unique identification number of the RFID-tag, which has to be transferred to the RFID-reader, using e.g. an R.S.A encryption method. However, such an encryption usually is time consuming, needing a certain amount of computational power, which is usually not available at RFID-tags.

Other commonly used techniques in order to securely provide e.g. the unique identification number of the RFID-tag is the hash-lock model. According to the hash-lock model, the RFID-tag sends the RFID-reader a random number and a validation number, wherein the validation number is computed using a hash function with the random number and the unique identification number of the RFID-tag as the arguments or variables of the hash function. Using the random number and the validation number the unique identification number can be inferred by the RFID-reader from a database, on which the unique identification number of the RFID-tag is stored.

BRIEF DESCRIPTION OF THE DRAWINGS

Example embodiments will be described below taking into account the enclosed figures. There is shown in FIG. 1: a schematic view of a data provision device and a data receiving device according to an embodiment.

DESCRIPTION

Figure 1:
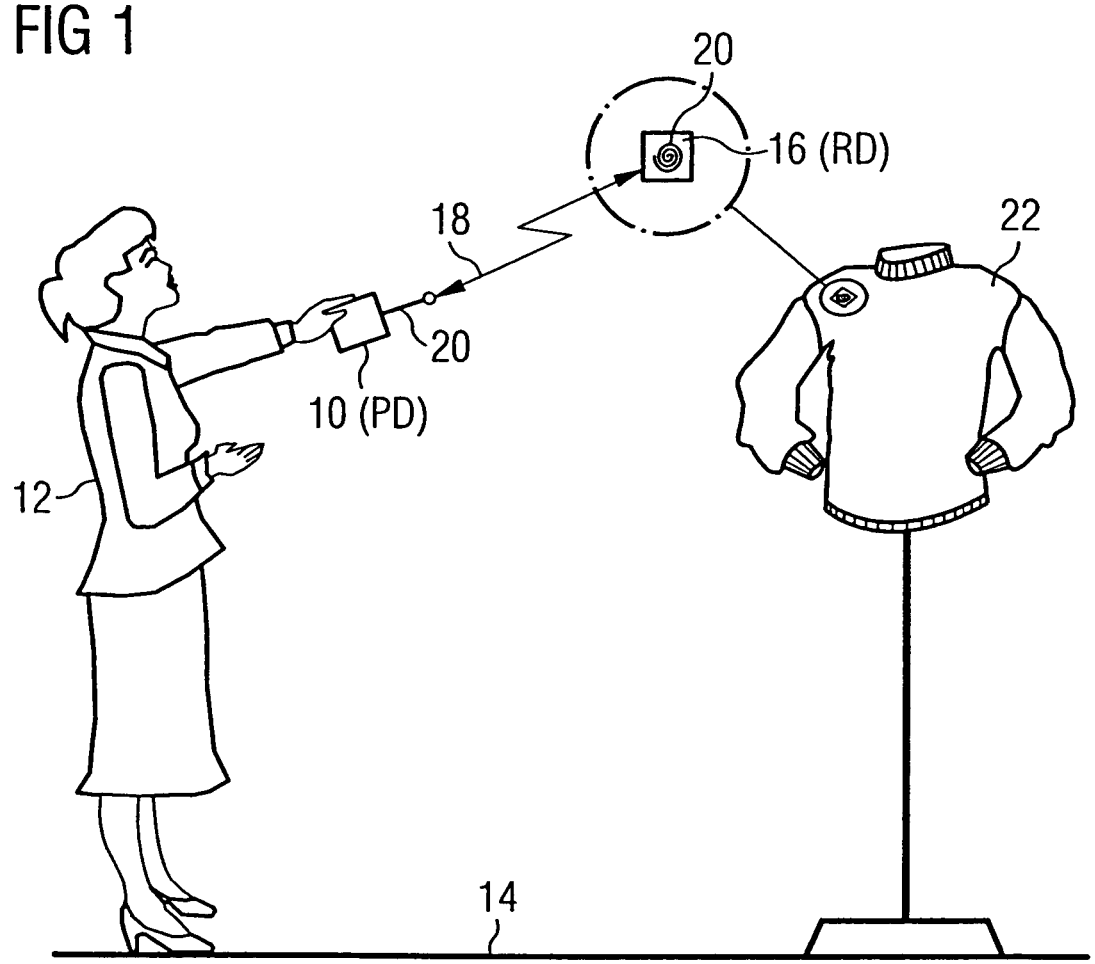

According to one aspect, there is provided a method for transferring data from a data provision device, such as a radio frequency identification reader, to a data receiving device, such as a radio frequency identification transponder, with (a) an initializing operation, comprising:
providing an initial authenticity-indicator;
providing at the data provision device an initial variable number as a current data-provision-device-variable-number;
providing at the data provision device a current data-provision-device-authenticity-indicator, as a function of the current data-provision-device-variable-number and the initial authenticity-indicator, particularly using a one-way-function;
setting at the data receiving device the initial authenticity-indicator as a foregoing data-receiving-device-authenticity-indicator;
providing at the data receiving device a current data-receiving-device-authenticity-indicator;
(b) a provision data provision operation, comprising:
determining at the data provision device a data-authenticity-indicator as a function of the provision data, particularly using a one-way-function;
providing at the data receiving device the data-authenticity-indicator and the provision data.

Following that, according to an example embodiment, there is provided an initial authenticity-indicator, which can be a pseudo-randomly generated variable. Pseudo-randomly generated means that the initial authenticity-indicator can be generated using a commonly known pseudo-random number generator, such as the function rando in the C/C++ programming language. Furthermore, a one-way-function may be a function, of which the inverse function is difficult to obtain, given the output of the function, only. Moreover, the one-way-function is substantially collision resistant. In other words, when using different input variables the one-way-function substantially always generates different output values. In particular, using conventionally known one-way-functions, the statistical probability of generating the same output value using two different input variables is less than approximately $10^{-10}$ in particular less than approximately $10^{-20}$.

Moreover, the initial authenticity-indicator can be generated at the data provision device or at the data receiving device and, during the initializing operation, be exchanged between the data provision device and the data receiving device. Furthermore, the operation of providing the initial authenticity-indicator and setting at the data receiving device the initial authenticity-indicator as a foregoing data-receiving-device-authenticity-indicator example can be carried out as one operation. Following that, during the initializing operation, the foregoing data-receiving-device-authenticity-indicator can be created using a conventionally known pseudo-random number generator. The so generated foregoing data-receiving-device-authenticity-indicator can then be transferred to the data provision device and be stored there as the current data-provision-device-variable-number. Moreover, the data-authenticity-indicator, which will be transferred from the data provision device to the data receiving device, is particularly generated a short time before transferring the provision data.

As an example, provision data can be transferred from the radio frequency identification reader to the radio frequency identification transponder. Previous to sending the provision data the data-authenticity-indicator has been generated. Also the data-authenticity-indicator can be sent from the radio-frequency identification reader to the radio frequency identification transponder. The data-authenticity-indicator can for example be used to verify, whether the provision data has been altered, e.g. by a third party, during the provision data provision operation.

Particularly, the provision data includes at least one of the following:
 message data,
 next data-provision-device-authenticity-indicator,
 current data-provision-device-variable-number,
 data provision device identification data and
 data receiving device identification data.

Following that, by providing the provision data, message data which can consist of e.g. a key word, software code a computer program or such a like, can be sent from the RFID-reader to the RFID-tag.

Moreover, the provision device identification data can be provided at the data receiving device. Following that, it is possible that one data receiving device can be provided with provision data from a number of data provision devices. Each of the data provision devices has individual data provision device identification data. Following that, it is possible that the data receiving device can distinguish between the provision data sent from the different data provision devices.

In other words, the provision data might include data provision device identification data, such that the data receiving device might be able to relate the provision data to a specific data provision device. Moreover, by providing the data provision device identification data at the data receiving device, it is possible to verify, whether the provision data has been provided from a data provision device, which indeed should communicate with the data receiving device.

According to an example embodiment, the operation of providing the provision data at the data receiving device comprises providing the next data-provision-device-authenticity-indicator as a next data-receiving-device-authenticity-indicator and the current data-provision-device-variable-number as a current data-receiving-device-variable-number.

Thus, the provision data is transferred from the data provision device to the data receiving device and the next data-provision-device-authenticity-indicator is set at the data receiving device as the next data-receiving-device-authenticity-indicator and the current data-provision-device-variable-number is set as the current data-receiving-device-variable-number.

According to a further example embodiment, the provision operation (b) further comprises:
providing at the data provision device a new variable number as the next data-provision-device-variable-number,
wherein the variable number is example generated using a pseudo-random number generator.

In particular, the provision data provision operation (b) further comprises:
determining at the data provision device a next data-provision-device-authenticity-indicator, as a function of the current data-provision-device-authenticity-indicator and the next data-provision-device-variable-number, particularly using a one-way-function.

Moreover, the operation of providing the provision data at the data receiving device particularly comprises providing the next data-provision device-authenticity-indicator as a next data-receiving-device-authenticity-indicator and the current data-provision-device-variable-number as a current data-receiving-device-variable-number.

Accordingly, in an example embodiment, the provision data comprises at least the next data-provision-device-authenticity-indicator and the current data-provision-device-variable number, which allow consecutive communication between the data provision device and the data receiving device. Additionally, the provision data can also comprise the message data and/or the data-provision-device-identification-data and/or the data-receiving-device-identification-data.

In particular, the provision operation (b) further comprises:
setting at the data provision device the next data-provision-device-variable-number as the current data-provision-device-variable-number and the next data-provision-device-authenticity-indicator as the current data-provision-device-authenticity indicator.

In other words, after providing the provision data at the data receiving device, the current data-provision-device-variable-number is replaced, particularly by a new pseudo-random number. Using said new pseudo-random number, the current data-provision-device-authenticity-indicator is newly generated.

In a further example embodiment, the method comprises after the operation (b) of providing the provision data:
(c) a data verification and authentication operation, comprising:
 comparing at the data receiving device
 the data-authenticity-indicator with a test-data-authenticity-indicator as a function of the provision data, determined at the data receiving device and
 the current data-receiving-device-authenticity-indicator with a test-authenticity indicator, determined at the data receiving device, as a function of the foregoing datareceiving-device-authenticity-indicator and the current data-receiving-device-variable-number.

In other words, at the data receiving device, the test-data-authenticity-indicator is created from the provision data transferred from the data provision device to the data receiving device. The test-data-authenticity-indicator is then compared to the data-authenticity-indicator. In case the data- and the test-data-authenticity-indicator are equal, the provision data has not been altered during the provision operation (b). Following that, there is provided an easy way to provide provision data from the data provision device at the data receiving device and being able to verify, whether the provision data as received at the data receiving device is identical to the provision data, as provided from the data provision device.

Moreover, the test-authenticity-indicator is created using particularly the current data-receiving-device-variable-number. Following that, even in case the transmission of the provision data from the data provision device to the data receiving device is surveyed from a third party, the third party only learns the current data-receiving-device-variable-number at the instant it is provided at the data receiving device.

Hence, the third party cannot provide altered provision data instead of the original provision data since the third party does not know the current data-receiving-device-variable-number before the provision of the provision data.

In other words, after a provision data has been provided to the data receiving device, in case the third party has surveyed provision of the provision data, the third party learns only the value of the current data-receiving-device-variable-number, which is simultaneously known to the data receiving device used only in combination with the currently sent provision data.

In order to authenticate further provision data, provided from the data provision device to the data receiving device, a new pseudo-random number is provided as a member of the provision data at the instant of the provision. Again, at the data receiving device, it can be verified, whether the provision data has been altered by comparing the data-authenticity-indicator with the test-data-authenticity-indicator. Further, it can be verified, whether a provision data has been provided by the correct data provision device by comparing the provided current data-receiving-device-authenticity-indicator with a test-authenticity-indicator, created at the data receiving device.

Advantageously, a secure authentication of the data provision device and a secure authentication/verification of the data provision device is possible, without using a password having to be known to both parties and which is susceptible to decryption, given a certain amount of time. Rather, it is an advantage of the present invention, that encryption of a password can be avoided. Thus, due to the lack of an encrypted password, even in case a third party surveys the communication between the data provision device and data receiving device, the communication cannot be corrupted, i.e. the provision data provided from the provision device can neither be replaced by data provided from the third party nor be altered during provision thereof, without recognition of the data receiving device. Following that, time consuming encryption of the provision data can be avoided. According to the invention, there is provided secure identification, whether the provision data received at the data receiving device has been provided by an authorized data provision device and whether the data provided is the original provision data.

In particular, due to the changing current data-receiving-device-variable-number, which is used in order to verify the correct identity of the data provision device, and since the current data-receiving-device-variable-number can only be used in order to authenticate the provision data, with which it has been sent, providing a fake provision data by the third party, is impossible. Accordingly, after initializing, an authenticated provision of data is established, since the components of the next data-provision-device-authenticity-indicator, which are provided during the provision of the provision data, cannot be derived from the third party.

In particular, the data verification and authentication operation (c) further comprises: setting at the data receiving device the current data-receiving-device-authenticity-indicator as the foregoing data-receiving-device-authenticity-indicator and the next data-receiving-device-authenticity-indicator as the current data-receiving-device-authenticity-indicator.

According to a further example embodiment, the operations (b) and (c) are repeatedly carried out.

In other words, it is possible that operations (b) and (c) are consecutively repeated, thus providing provision data according to operation (b) and immediately verifying and authenticating the provision of the provision data according to operation (c).

However, it might also be possible to provide a number of provision data by repeatedly carrying out operation (b) and after having carried out operation (b) a certain number of times, operation (c) is carried out particularly the same number of times, in order to verify and authenticate the different number of provision data. Alternatively, a large number of provision data and corresponding data-authenticity-indicator can be generated by the data provision device. Following that, the provision data has only to be provided without the necessity of any further successive generation of the data-authenticity-indicators and the respective provision data, such as provision-device-variable-number and/or provision-device-authenticity-indicator and/or message data.

As has been described above, in order to authenticate the provision data, there has to be provided the current data-receiving-device-variable-number and the foregoing data-receiving-device-authenticity-indicator. Accordingly, a third party could survey the provision of the provision data from the first time, provision data is provided at the data receiving device. However, since the method of the present invention is initiated, using the initial authenticity-indicator, he would never be able to calculate the current data-receiving-device-authenticity-indicator, since the first provision-device-variable-number is secret and solely known to the data provision device. Moreover, particularly before sending the first provision data, the first provision-device-variable-number is known to the data provision device only, i.e. not to the data-receiving-device.

In particular, at each operation (b) new message data can be provided at the data receiving device. Following that, it is possible to instruct the data receiving device to carry out a variety of actions, by providing different message data with each data provision operation.

According to a further example embodiment, the current data-provision-device-authenticity-indicator and/or the next data-provision-device-authenticity-indicator and/or the data-authenticity-indicator and/or the test-data-authenticity-indicator and/or the test-authenticity-indicator is/are calculated using a one-way-function, in particular at least one of:

$PDAI_i = h_1(PDVN_i, AI_0)$, $PDAI_{i+1} = h_1(PDVN_{i+1}, PDAI_i)$, $DataAI = h_2(DataP)$, $DataAI_{test} = h_2(DataP)$ and $AI_{test} = h_1(RDVN_i, RDAI_{i-1})$, wherein $AI_0$ represents the initial-authenticity-indicator, $PDVN_i$ represents the current data-provision-device-variable-number, $PDVN_{i+1}$ represents the next data-provision-device-variable-number, DataP represents the provision data, $RDAI_{i-1}$ represents the foregoing data-receiving-device-authenticity-indicator, $RDVN_i$ represents the current data-receiving-device-variable-number, $PDAI_i$ represents the current data-provision-device-authenticity-indicator, $PDAI_{i+1}$ represents the next data-provision-device-authenticity-indicator, DataAI represents the data-authenticity-indicator, $DataAI_{test}$ represents the test-data-authenticity-indicator, $AI_{test}$ represents the test-authenticity-indicator and $h_1$ and $h_2$ represent the one way functions.

Example, $h_1$ and $h_2$ can represent different one-way-functions. However, it may also be possible, that $h_1$ and $h_2$ represent the same one-way function.

Further particularly, the one way functions are hash functions, in particular the one way functions are chosen from the set of hash functions comprising at least: SHA-1, SHA-224, SHA-256, SHA-384, SHA-512, MD2, MD4, MD5 and RIP-EMD-160, GOST-Hash, CRC-32, Ghash-3, Snefru, Tiger and Whirlpool. The before mentioned hash functions are particularly conventionally known hash functions, which are e.g. described in the web page "www.wikipedia.org" and implemented e.g. in commonly known programs, calculating the output value of hash functions, as referred to on the web page "www.wikipedia.org". According to the invention, a hash function is a function that generates a fixed-length string of data from a message of arbitrary length. The function produces a substantially unique value for every unique input message. In other words, the hash functions calculates from a substantially arbitrary input variable a output of a specific length, wherein, given the output only, it is not possible to infer the input variable. Moreover, there exist substantially no two input variables, which when used as the arguments or variables of the hash function, respectively, the same output is calculated therefrom. That means, the hash function is substantially collision resistant, i.e. given two different input variables, the statistical probability of creating two identical output variables using the conventionally known hash function is example less than approximately $10^{-10}$ more in particular less than approximately $10^{-20}$.

Moreover, further particularly, the length of the current provisional-device-variable-number and the next provisional-device-variable-number are as long in bit sequence, as the length of the output of the hash function, i.e. number of bits of the current provisional-device-variable-number and the next provisional-device-variable-number, respectively, can be as large as the number of bits of the output of the hash function, e.g. the current data-provision-device-authenticity-indicator or the next current data-provision-device-authenticity-indicator.

Accordingly, as already pointed out above, in case the provision of the provision data is surveyed by a third party, it is not possible to infer e.g. the initial authenticity-indicator from the current provision-device-authenticity-indicator, provided during provision of provision data. Following that, a third party surveying provision of the provision data cannot determine any further provision-data-authenticity-indicator, since consecutive provision-data-authenticity-indicators are calculated using the hash function and, as the arguments or variables of the hash function the foregoing provision-device-authenticity-indicator and the provision-device-variable-number, i.e. a pseudo-random number. The provision-device-variable-number is kept secret by the data provision device until it is provided to the data receiving device simultaneously with the provision data, for which authentication and verification it is used to.

In particular, the message data comprises computer program code to be carried out by the data receiving device.

According to a further example embodiment, the operation of providing the provision data to the data receiving device includes sending the provision data via radio-channel. Example, the frequency used for providing data can be at least one of the set of ranges comprising approximately between 125 kHz and 134 kHz, approximately between 400 MHz and 930 MHz, approximately 13,56 MHz, approximately 2,45 GHz, approximately 5,8 GHz.

Accordingly, the data provision device particularly comprises a radio frequency transmitter and the date receiving device may comprise a radio frequency receiver.

An example embodiment provides a computer program product, in particular stored on a computer-readable storage medium, which, when loaded on a data provision device, carries out the method according to any one of the foregoing claims.

According to a further example embodiment, there is provided a data provision device capable of transmitting provision data to a data receiving device comprising:

a variable number generating device;

a data-provision-device-authenticity-indicator generating device, capable of generating a data-provision-device-authenticity-indicator, particularly using a one-way-function;

a data-authenticity-indicator generating device, capable of generating a data-authenticity-indicator, particularly using a one-way-function; and a provision data provision device.

In particular, the data provision device further comprises a message data provision device capable for providing message data. The message data provision device can be adapted e.g. to generate the message data and/or to receive the message data from a further input device, such as a keyboard. Furthermore, the message data provision device can provide the message data from a database, wherein the database can be an external database or an internal database.

In particular, the provision data provision device comprises a radio frequency emitter.

According to a further example embodiment, there is provided a data receiving device capable of receiving provision data, from a data provision device comprising:

a provision data receiving device;

a test-data-authenticity-indicator generating device, capable of generating a test-data-authenticity-indicator, particularly using a one-way-function;

a test-authenticity-indicator generating device, capable of generating a test-authenticity-indicator, particularly using a one-way-function.

In particular, the data receiving device further comprises a comparing device adapted to compare the data-authenticity-indicator with the test-data-authenticity-indicator and the current data-receiving-device-authenticity-indicator with the test-authenticity-indicator.

Example, the provision data receiving device comprises a radio-frequency receiver.

A further aspect may comprise a communication system comprising a data provision device and a data receiving.

FIG. 1 shows a data provision device in the example form of a radio frequency identification reader 10 (in the following RFID-reader). The RFID-reader 10 can be held by a user 12. However, the RFID-10 can be mounted to a wall (not shown) or the ground surface 14. The RFID-reader 10 communicates (in a one- or a bi-directional way) with a radio frequency identification transponder 16 (in the following RFID-tag) via radio frequency, indicated by line 18. In order to establish a proper communication, both, the RFID-reader 10 and the RFID-tag 16 comprise an antenna 20, each. Moreover, the RFID-tag 16 may be attached to a product e.g. a clothing like a jacket 22, as shown. The jacket 22 can for example be sold in a warehouse (not shown). However, the RFID-tag 16 can be attached to or mounted on any other item or product or entity, in particular to a movable item, which has to be secured or to which communication with an RFID-reader 10 has to be provided.

The RFID-reader 10 and the RFID-tag 16 do not necessarily have to communicate via radio frequency communication 18. Rather, there can be used any other communication method, i.e. they can be connected with each other via electrical connection, USB connection, optical connection, blue tooth connection or any other communication via any other one- or bi- or multi-directional system (e.g. internet).

The RFID-reader 10 could be used to e.g. store data on the RFID-tag 16 or to provide commands at the RFID-tag 16, such that at the RFID-tag 16 specific actions can be carried out. For example, the RFID-reader 10 can provide message data at the RFID-tag 16 so that the RFID-tag 16 puts itself in an activated or an inactivated condition. For instance, in case the jacket 22 is sold at the warehouse, when scanning the price of the jacket 22, simultaneously the RFID-reader can deactivate the RFID-tag 16. Following that, the customer (not shown) leaving the warehouse with the paid jacket 22, will not trigger an alarm. For that case, the RFID-reader 10 can be provided anywhere close to the cash-desk, it can e.g. be included in a scanning device for scanning the price or in the table, where the jacket 22 is packed in a bag.

However, in case the jacket 22 is taken outside the warehouse without previously deactivating the RFID-tag 16, an alarm is triggered as an example resulting operation. Moreover, the provision data can be such that, after receiving the provision data from the RFID-reader 10, the RFID-tag 16 will send a unique identification number of the RFID-tag 16 to the RFID-reader 10. Thus, there is provided an easy way to establish a quick overview of the number of RFID-tags 16 within the range of the RFID-reader 10. Further, it might also be possible to e.g. distinguish between different RFID-tags 16 and the goods related to the respective RFID-tags 16. For example, there might be provided a database, comprising the respective identification numbers of the RFID-tags 16 and the type of clothes, their color, size etc., at which the RFID-tags are arranged. Using a RFID-reader 16, which e.g. can be able to communicate with all the RFID-tags 16 within the warehouse and which can also access the database, it is easily and quickly possible to provide a fast inventory list of the goods, e.g. clothes, stored in the warehouse.

Moreover, it might not even be necessary to provide specific message data from the RFID-reader 10 to the RFID-tag 16. Rather, it could be sufficient to provide a unique identification number PDID of the RFID-reader 10 at the RFID-tag 16. When submitting the identification number PDID to the RFID-tag 16, after authenticating and verifying the identification number PDID, the RFID-tag 16 could automatically bring itself into an inactive or an active condition or data stored on the RFID-tag 16 could be provided to a further device. For example, the RFID-reader 10 could replace a conventional bar code scanner. When a customer buys e.g. jacket 22, the RFID-tag 16 could be deactivated by the RFID-reader 10 and simultaneously price information of the jacket 22 being stored on the RFID-tag 16, could be provided at the cash desk. In that case, the price information could be transmitted from the RFID-tag 16 to the RFID-reader 10. Alternatively, there might be a further RFID-reader (not shown) being arranged near and in communication with the cash desk.

Figure 2:
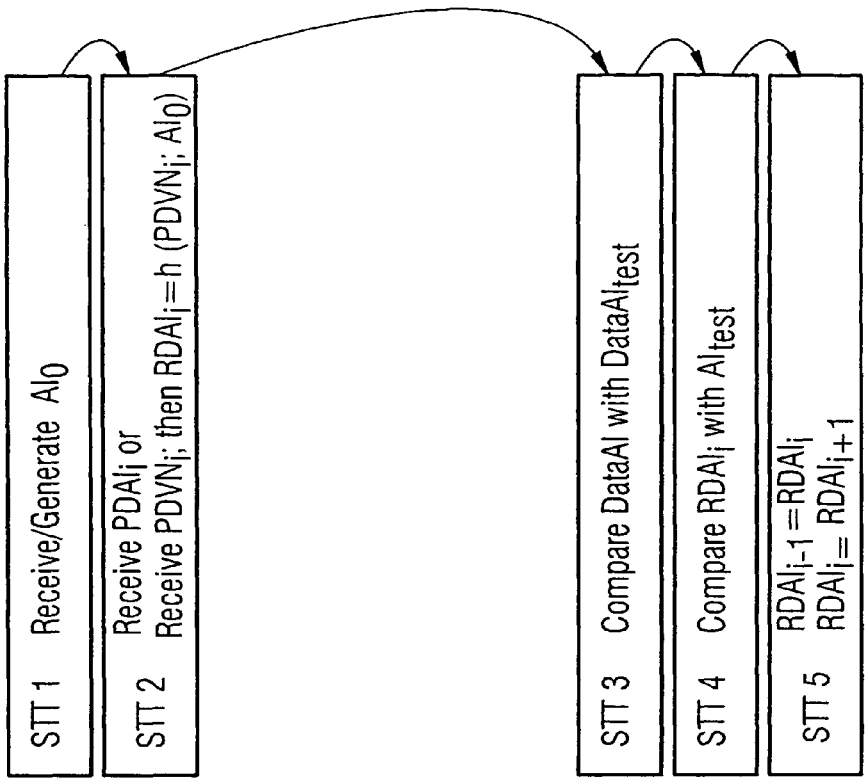
FIG. 2: a flow diagram of the operation of a data provision device.
Figure 3:
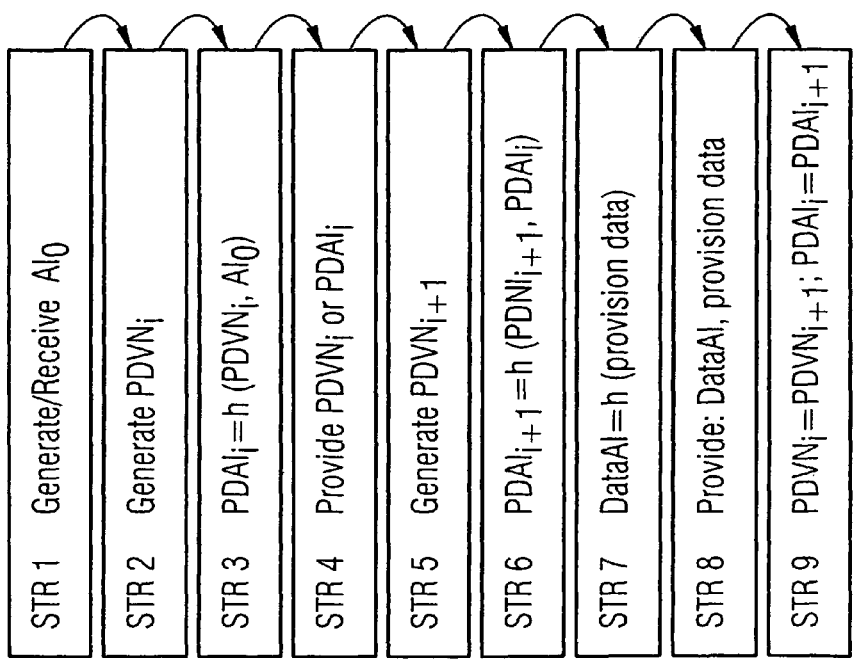
FIG. 3: a flow diagram of the operation of the data receiving device.

The communication between the RFID-reader 10 and the RFID-tag 16 is further described using the flow diagrams as shown in FIGS. 2 and 3.

FIG. 2 and FIG. 3 show a flow diagram of the operation of the RFID-reader 10 (as an example data provision device) and the RFID-tag 16 (as an example data receiving device). In order to establish proper authentication and verification of the communication between the RFID-reader 10 and the RFID-tag 16 both, the RFID-reader 10 and the RFID-tag 16 have to be initialized. In particular, in order to authenticate and verify the identification of the provision data, the RFID-reader 10 and the RFID-tag 16 have to be initialized (operations STR1 to STR4 and STT1 and STT2).

During initializing, either the RFID-reader 10 or the RFID-tag 16 creates an initial authenticity-indicator $AI_0$ (operations STR1, STT1). Particularly, the initial authenticity-indicator $AI_0$ can be generated by the RFID-reader 10 and burnt into the RFID-tag 16 memory (not shown). The initial authenticity-indicator $AI_0$ can be a pseudo-randomly generated bit sequence. Pseudo-randomly generated means generated using a conventional random number generator such as the function rand( ) which is incorporated in the C/C++ programming language. As an example, the initial authenticity-indicator $AI_0$ has the value of $$AI_0 = 61\ 61\ 61\ 61\ 61\ 61\ 61\ 61\ 61\ 61\ 61\ 61\ 61\ 61\ 61\ 61.$$

The initial authenticity-indicator $AI_0$ is exchanged between the RFID-reader and the RFID-tag in a secure way. For example, during initializing, it might be necessary to bring the RFID-reader 10 and the RFID-tag 16 into physical contact or to provide exchange via radio frequency communication 18 in a secure environment. The initial authenticity-indicator $AI_0$ can be provided by the RFID-reader 10 and burnt into the memory (not shown) of the RFID-tag 16 during production of the RFID-tag 16.

Further, during initializing, the RFID-reader 10 generates a first variable-number $PDVN_i$ (as an example current data-provision-device-variable-number). As an example, when sending the first message, i.e. i=1, the first variable-number $PDVN_1$ has the value of $$PDVN_1 = 31\ 31\ 31\ 31\ 31\ 31\ 31\ 31\ 31\ 31\ 31\ 31\ 31\ 31\ 31\ 31$$

(Operation STR2).

Moreover, during initializing, a current authenticity-indicator $PDAI_1$ (as an example data-provision-device-authenticity-indicator) is generated using a one-way function, such as a conventionally known hash function. The current authenticity indicator $PDAI_1$ is computed using the hash function and the initial authenticity-indicator $AI_0$ and the first variable number $PDVN_1$ as the arguments or variables of the hash function (operation STR 3). Either the current authenticity-indicator $PDAI_1$ or the first variable number $PDVN_1$ is then sent in a secure way to the RFID-tag 16 (operation STR 4). The current authenticity-indicator $PDAI_1$ can be provided at the RFID-tag 16 during the initializing thereof. For example, during production of the RFID-tag 16, the initial-authenticity-indicator $AI_0$ and the current authenticity-indicator $PDAI_1$ are provided at the RFID-tag 16. They can be burnt into a memory (not shown) of the RFID-tag 16. Further carrying out the above example, the current authenticity-indicator $PDAI_i$ is calculated from the initial authenticity-indicator $AI_0$ and the first variable number $PDVN_1$, as an example, using as the hash function the conventionally known MD5. The current authenticity-indicator $PDAI_1$ is computed as:

$$PDAI_1 = h_{MD5}(PDVN_1, AI_0)$$

$$= h_{MD5}\begin{pmatrix} 31\,31\,31\,31\,31\,31\,31\,31\,31\,31\,31\,31\,31\,31\,31\,31, \\ 61\,61\,61\,61\,61\,61\,61\,61\,61\,61\,61\,61\,61\,61\,61\,61 \end{pmatrix}$$

$$= 93\ 69\ 7F\ 1F\ D9\ 8F\ CC\ 70\ E1\ 36\ 6A\ 29\ 2C\ 61\ 83\ 7D.$$

Initializing of the RFID-reader 10 is then completed.

Accordingly, during initializing the RFID-tag 16, the initial authenticity-indicator ($AI_0$) is either created at the RFID-tag 16 or received at the RFID-tag 16 from the RFID-reader 10 (operation STT 1). Further, the current authenticity-indicator $PDAI_i$ is received at the RFID-tag 16 and, at the RFID-tag 16 referred to as $RDAI_i$ (as an example current receiving-device-authenticity-indicator). According to the present example, at the RFID-tag 16, the Following that, the current authenticity-indicator is referred to $RDAI_1$.

$$RDAI_1 = 93\ 69\ 7F\ 1F\ D9\ 8F\ CC\ 70\ E1\ 36\ 6A\ 29\ 2C\ 61\ 83\ 7D.$$

Alternatively, it may be possible to send the first variable number $PDVN_1$ to the RFID-tag 16 and calculate the current authenticity-indicator $RDAI_1$ at the RFID-tag 16, using the hash function and the first variable number $PDVN_1$ and the initial authenticity indicator $AI_0$ as its arguments or variables (operation STT2). Initializing of the RFID-tag 16 is then completed.

Next, provision of provision data by the RFID-reader 10 is described (operations STR 5 to STR 9). Before sending provision data from the RFID-reader 10 to the RFID-tag 16, a data-authenticity-indicator DataAI is created, whereby the data-authenticity-indicator is calculated using a conventional hash function and as the arguments or variables of the hash function one or more of the unique identification number PDID of the RFID-reader 10 (as example data provision device identification data), a unique identification number RDID of the RFID-tag 16 (as example data receiving device identification data), a message data MD, which can e.g. comprise computer program code, the first variable number $PDVN_1$ and a next authenticity-indicator $PDAI_{i+1}$ (as an example next provision-device-authenticity-indicator)

Since in the present example i=1, the next authenticity-indicator $PDAI_{i+1}$ is referred to $PDAI_2$.

In the present example, the unique identification number PDID of the RFID-reader 10 is chosen as $$PDID = A,$$

the unique identification number RDID of the RFID-tag 16 is chosen as $$RDID = B,$$

the message data MD is chosen as:

$$MD = \text{``Read } EPC\text{''},$$

where EPC can be an electronic product number of the item to which the RFID-tag 16 is attached to, first variable number $PDVN_1$ is given, as described above:

$$PDVN_1 = 31\ 31\ 31\ 31\ 31\ 31\ 31\ 31\ 31\ 31\ 31\ 31\ 31\ 31\ 31\ 31,$$

For provision of data, the following operations are carried out: In order to provide the next authenticity-indicator $PDAI_2$ a next variable number $PDVN_{i+1}$ (as an example next provision-device-variable-number), which can be a pseudo-random number, has to be generated by the RFID-reader 10. In accordance to the above terminology, in the present example, the next variable number $PDVN_{i+1}$ is referred to $PDVN_2$.

In particular, in the present example, the next variable number $PDVN_2$, is equal to:

$$PDVN_2 = 32\ 32\ 32\ 32\ 32\ 32\ 32\ 32\ 32\ 32\ 32\ 32\ 32\ 32\ 32\ 32.$$

As an alternative, the next variable number can be taken from a database comprising a particularly large number of variables. Either the variables can be chosen substantially independent of the stored sequence of the variables or the stored variables are substantially randomly stored in the database, wherein the variables can be all different from each other. It may also be possible to provide the same variable several times (operation STR 5).

The next authenticity indicator $PDAI_2$ is generated using a hash function and as the arguments or variables of the hash function the next variable number $PDVN_2$ and the current authenticity indicator $PDAI_1$. Accordingly, the next authenticity indicator $PDAI_2$ is equal to:

$$PDAI_2 = h_{MD5}(PDVN_2, PDAI_1) \quad \text{(operation } STR\,6)$$

$$= h_{MD5}\begin{pmatrix} 32\,32\,32\,32\,32\,32\,32 \\ 32\,32\,32\,32\,32\,32\,32\,32\,32, \\ 93\ 69\ 7F\ 1F\ D9\ 8F\ CC \\ 70\ E1\ 36\ 6A\ 29\ 2C\ 61\ 83\ 7D \end{pmatrix}$$

$$= B5\ E5\ EF\ 6E\ 6C\ 50\ C5\ D6$$

$$52\ D1\ D6\ C1\ 57\ 59\ 63\ FB$$

Next, a data-authenticity-indicator DataAI is generated at the RFID-reader 10. The data-authenticity-indicator DataAI is computed from the hash function of the provision data. The provision data can comprise the message data MD, the unique identification number PDID of the RFID-reader 10, the unique identification number RDID of the RFID-tag 16, the first variable number $PDVN_1$ and a next authenticity indicator $PDAI_2$. In the present example, the data-authenticity-indicator is calculated as:

$$DataAI = h_{MD5}\begin{pmatrix} MD,\ PDID,\ RDID, \\ PDVN_1,\ PDAI_2 \end{pmatrix} \quad \text{(operation } STR\ 7)$$

$$= h_{MD5}\begin{pmatrix} \text{``Read } EPC\text{''},\ A,\ B, \\ 31\,31\,31\,31\,31\,31\,31\,31\,31 \\ 31\,31\,31\,31\,31\,31\,31,\ B5\ E5 \\ EF\ 6E\ 6C\ 50\ C5\ D6\ 52 \\ D1\ D6\ C1\ 57\ 59\ 63\ FB \end{pmatrix}$$

$$= 8E\ 02\ 9F\ 77\ F2\ 7D\ 50\ 49\ D3\ B3\ 76$$

$$E0\ 03\ 5D\ 97\ BF.$$

The provision data and the data-authenticity-indicator DataAI are then provided at RFID-tag 16 (operation STR 8).

In case further message data MD should be provided from the RFID-reader 10 to the RFID-tag 16, the next variable number $PDVN_2$ is used as the first variable number $PDVN_1$. Further, at the RFID-reader 10 the next authenticity-indicator $PDAI_2$ is used as the current authenticity-indicator $PDAI_i$ (operation STR 9). One cycle of provision of data is then completed. In order to provide further provision data, operations STR 5 to STR 9 can then be repeatedly carried out.

In the following the authentication and verification at the RFID-tag 16 is described (operations STT 3 to STT 5).

After having been sent to the RFID-tag 16, the current authenticity-indicator $PDAI_1$ is referred to as current authenticity-indicator $RDAI_1$ (as an example current receiving-device-authenticity-indicator), the next authenticity-indicator $PDAI_2$ is referred to as next authenticity-indicator $RDAI_2$ (as an example next receiving-device-authenticity-indicator) and the first variable number $PDVN_1$ is referred to as first variable-number $RDVN_1$. Accordingly, $RDAI_1 = PDAI_1 = 93\ 69\ 7F\ 1F\ D9\ 8F\ CC\ 70\ E1\ 36\ 6A\ 29\ 2C\ 61\ 83\ 7D,$ $RDAI_2 = PDAI_2 = B5\ ES\ EF\ 6E\ 6C\ 50\ C5\ D6\ 52\ D1\ D6\ C1\ 57\ 59\ 63\ FB,$ $RDVN_1 = PDVN_1 = 31\ 31\ 31\ 31\ 31\ 31\ 31\ 31\ 31\ 31\ 31\ 31\ 31\ 31\ 31.$ Next, at the RFID-tag 16, the data-authenticity-indicator DataAI is compared with a test data-authenticity-indicator $DataAI_{test}$. Therefore, the test data-authenticity-indicator $DataAI_{test}$ is computed at the RFID-tag 16 similar to the computation of the data-authenticity-indicator DataAI at the RFID-reader 16 (see operation STR 7), but using the provided provision data instead. In other words, the test data-authenticity-indicator $DataAI_{test}$ is computed using the hash function and as its arguments or variables the same elements, as are used for the data-authenticity-indicator DataAI, but which have been provided from the RFID-reader 10 to the RFID-tag 16. Accordingly the test data-authenticity-indicator $DataAI_{test}$ is equal to:

$$DataAI_{test} = h_{MD5}\begin{pmatrix} MD, PDID, \\ RDID, RDVN_1, \\ RDAI_2 \end{pmatrix} \quad \text{(operation } STT\ 3\text{)}$$

$$= h_{MD5}\begin{pmatrix} \text{"Read } EPC\text{", } A, B, \\ 31\ 31\ 31\ 31\ 31\ 31\ 31\ 31\ 31 \\ 31\ 31\ 31\ 31\ 31\ 31\ 31, B5\ E5 \\ EF\ 6E\ 6C\ 50\ C5\ D6\ 52 \\ D1\ D6\ C1\ 57\ 59\ 63\ FB \end{pmatrix}$$

$= 8E\ 02\ 9F\ 77\ F2\ 7D\ 50\ 49\ D3\ B3\ 76$ $E0\ 03\ 5D\ 97\ BF.$

In case the data-authenticity-indicator DataAI and the test data-authenticity-indicator $DataAI_{test}$ match, a further operation is carried out by the RFID-tag 16.

A test authenticity-indicator $AI_{test}$ is computed at the RFID-tag 16 using a hash function and as the arguments or variables of the hash function a foregoing authenticity-indicator $RDAI_{i-1}$ (as an example foregoing receiving-device-authenticity-indicator) and the first variable-number $RDVN_1$. According to the present example, the foregoing authenticity-indicator is referred to as $RDAI_0$. When sending the first message, the value of foregoing authenticity indicator $RDAI_0$ is equal to the value of the initial authenticity-indicator $AI_0$. According to the above example, $AI_{test} = h_{MD5}(RDAI_0, RDVN_1).$ After sending the first message, the test authenticity-indicator $AI_{test}$ is calculated as follows:

$AI_{test} = h_{MD5}(AI_0, RDVN_1)$ $$= h_{MD5}\begin{pmatrix} 61\ 61\ 61\ 61\ 61\ 61\ 61\ 61\ 61\ 61\ 61\ 61 \\ 61\ 61\ 61\ 61, 31\ 31\ 31\ 31\ 31\ 31\ 31 \\ 31\ 31\ 31\ 31\ 31\ 31\ 31\ 31 \end{pmatrix}$$

$= 93\ 69\ 7F\ 1F\ D9\ 8F\ CC\ 70\ E1\ 36\ 6A\ 29\ 2C\ 61\ 83\ 7D.$

The current authenticity-indicator $RDAI_1$ is compared with the test authenticity-indicator $AI_{test}$. In case the current authenticity-indicator $RDAI_i$ and the test authenticity-indicator $AI_{test}$ match, the message data MD is accepted, and e.g. a respective program code/action can carried out at/from the RFID-tag 16 (operation STT 4). Carrying out a specific action can also involve sending data to a further device, which might not be the RFID-reader 10. According to the present example, the RFID-tag 16 would carry out the command "Read EPC", i.e. the RFID-tag 16 could provide the EPC to the RFID-reader 10.

In case further provision data should be received at the RFID-tag 16, the value of foregoing authenticity-indicator $RDAI_0$ is replaced by the value of the current authenticity-indicator $RDAI_i$ and afterwards, the value of the current authenticity-indicator $RDAI_1$ is replaced by the value of the next authenticity-indicator $RDAI_2$ (provided by the RFID-reader 16 as the next authenticity-indicator $PDAI_2$ during STR 8)(STT 5). Authentication and verification of the provision data is then complete.

Accordingly, any further number of message data can be transmitted from the RFID-reader 10 to the RFID-tag 16, i.e. any further number of actions can be carried out by the RFID-tag 16, increasing the value of the count number i by one, i.e. i=2, when sending the second message.

Following that, communication between the RFID-reader 10 and the RFID-tag 16 is very safe, even though a time consuming encryption/decryption of (message) data is not necessary. Rather, the (message) data can be surveyed/read by a third party. However, it is not possible that the RFID-tag 16 carries out e.g. program code, which is not provided by the RFID-reader 10.

The present invention is not limited to the embodiments, as described above. Rather, many other embodiments thereof are possible. For example, instead of using the RFID-reader 10 and the RFID-tag 16 any other system of electronic emitter and receiver, which have to communicate and in particular successively exchange data, can be used. Moreover, it also possible that the RFID-tag 16 receives data from the RFID-reader 10 and further provides data in the above described manner to a further RFID device. Then the RFID-tag 16 would also function as an RFID-reader for a further device, which, in turn, would function as an RFID-tag. The chain could be extended, such that a variety of RFID-tags would simultaneously function as RFID-readers.

LIST OF REFERENCE NUMERALS

10 RFID-reader
12 user
14 ground surface
16 RFID-tag
18 radio frequency communication 20 antenna
22 jacket
PDID, RDID unique identification number
MD message data
$AI_0$ initial authenticity-indicator
$PDVN_i$, $RDVN_i$
$PDVN_1$, $RDVN_1$ first variable number
$PDVN_{i+1}$
$PDVN_2$ next variable number
$PDAI_i$, $RDAI_i$
$PDAI_1$, $RDAI_1$ current authenticity-indicator
$PDAI_{i+1}$, $RDAI_{i+1}$
$PDAI_2$, $RDAI_2$ next authenticity-indicator
$RDAI_{i-1}$
$RDAI_0$ foregoing authenticity-indicator
DataAI data-authenticity-indicator
$DataAI_{test}$ test data-authenticity-indicator
$AI_{test}$ test authenticity-indicator

What is claimed is:

1. A method comprising:
providing an initial variable number as a current data-provision-device-variable-number;
providing a new variable number as a next data-provision-device-variable-number;
providing a current data-provision-device-authenticity-indicator as a function of the current data-provision-device-variable-number and an initial authenticity-indicator;
providing a next data-provision-device-authenticity-indicator as a function of the current data-provision-device-authenticity indicator and the next data-provision-device-variable number;
determining a data-authenticity-indicator as a function of a provision data, the provision data including the current data-provision-device-variable-number, the next data-provision-device-authenticity-indicator, and a message data, wherein the determining is performed by one or more processors; and
sending a message to a data receiving device, the message including the provision data and the data-authenticity-indicator.

2. The method according to claim 1, wherein the provision data includes at least one of:
data provision device identification data; and
data receiving device identification data.

3. The method according to claim 1, wherein at least one of the current data-provision-device-authenticity-indicator, the next data-provision-device-authenticity-indicator, the data-authenticity-indicator, a test-data-authenticity-indicator, and a test-authenticity-indicator is calculated using a one-way-function, in particular accordance with at least one of the following formulas:

$$PDAI_i = h_1(PDVN_i, AI_0),$$

$$PDAI_{i+1} = h_1(PDVN_{i+1}, PDAI_i),$$

$$DataAI = h_2(DataP),$$

$$DataAI_{test} = h_2(DataP) \text{ and}$$

$$AI_{test} = h_1(RDVN_i, RDAI_{i-1}),$$

wherein
$AI_0$ represents the initial-authenticity-indicator,
$PDVN_i$ represents the current data-provision-device-variable-number,
$PDVN_{i+1}$ represents the next data-provision-device-variable-number,
DataP represents the provision data,
$RDAI_{i-1}$ represents the foregoing data-receiving-device-authenticity-indicator,
$RDVN_i$ represents the current data-receiving-device-variable-number,
$PDAI_i$ represents the current data-provision-device-authenticity-indicator,
$PDAI_{i+1}$ represents the next data-provision-device-authenticity-indicator,
DataAI represents the data-authenticity-indicator,
$DataAI_{test}$ represents the test-data-authenticity-indicator,
$AI_{test}$ represents the test-authenticity-indicator, and
$h_1$ and $h_2$ represent the one way functions.

4. The method according to claim 3, wherein the one way functions are hash functions.

5. The method according to claim 3, wherein the one way functions are chosen from the set of hash functions comprising at least: SHA-1, SHA-224, SHA-256, SHA-384, SHA-512, MD2, MD4, MD5 and RIPEMD-160, Snefru, Tiger and Whirlpool.

6. The method according to claim 1, wherein the message data comprises computer program code to be carried out by the data-receiving-device.

7. The method according to claim 1, wherein the step of providing the provision data to the data receiving device includes sending the provision data via radio channel.

8. The method according to claim 1, wherein the data provision device comprises a radio frequency transmitter.

9. The method according to claim 1, wherein the data-receiving-device comprises a radio frequency receiver.

10. A data provision device comprising:
a variable number generating device to provide an initial variable number as a current data-provision-device-variable-number and to provide a new variable number as a next data-provision-device-variable-number;
a data-provision-device-authenticity-indicator generating device to provide a data-provision-device-authenticity-indicator as a function of the current data-provision-device-variable-number and an initial authenticity-indicator and to provide a next data-provision-device-authenticity-indicator as a function of the current data-provision-device-authenticity indicator and the next data-provision-device-variable-number;
a data-authenticity-indicator generating device to provide a data-authenticity-indicator as a function of the provision data, the provision data including the current data-provision-device-variable-number, the next data-provision-device-authenticity-indicator, and a message data; and
a provision data provision device to send a message from a data provision device to a data receiving device, the message including the provision data and the data-authenticity-indicator.

11. The data provision device according to claim 10, wherein the provision data provision device comprises a radio frequency emitter.

12. The method of claim 1, further comprising:
setting the next data-provision-device-variable-number as the current data-provision-device-variable-number;
setting the next data-provision-device-authenticity-indicator as the current data-provision-device-authenticity-indicator;
providing a new variable number as the next data-provision-device-variable-number;
generating an additional next data-provision-device-authenticity-indicator as a function of the current dataprovision-device-authenticity-indicator and the next data-provision-device-variable-number;

determining an additional data-authenticity-indicator as a function of an additional provision data, the additional provision data including the current data-provision-device-variable-number, the next data-provision-device-authenticity-indicator, and an additional message data, wherein the determining is performed by one or more processors; and sending an additional message to the data receiving device, the additional message including the additional provision data and the additional data-authenticity-indicator.

13. The method of claim 1, further comprising generating at least one of the initial authenticity-indicator, the current provision-device variable number, and the next data-provision-device-variable number using a pseudo-random number generator.

14. The method of claim 1, further comprising sending the initial authenticity-indicator to a data receiving device or receiving the initial authenticity-indicator from the data receiving device by bringing a data provision device into physical contact with the data receiving device or using a radio frequency communication in a secure environment.

15. A method comprising,
receiving a message from a data provision device, the message including a provision data and a data-authenticity-indicator, the provision data including a current data-provision-device-variable-number and a message data;
computing a test data-authenticity-indicator as a function of the provision data;
comparing the data-authenticity indicator with the test-data-authenticity-indicator, wherein the comparing is performed by one or more processors;
setting an initial-authenticity-indicator as a foregoing receiving-device-authenticity-indicator;
setting the current data-provision-device-variable as a current data-receiving-device-variable number;
based on the comparing of the data-authenticity indicator with the test-data-authenticity indicator:
   computing a test authenticity-indicator as a function of the foregoing receiving-device-authenticity-indicator and the current data-receiving-device-variable-number;
   comparing a current receiving-device-authenticity-indicator with the test authenticity-indicator; and
   accepting the message data based on the comparing of the current authenticity-indicator with the test authenticity-indicator.

16. The method of claim 15, further comprising:
receiving an additional message from the data provision device, the additional message including an additional provision data and an additional data-authenticity-indicator, the additional data-authenticity-indicator being a function of the additional provision data;
computing an additional test data-authenticity-indicator as a function of the additional provision data; and
comparing the additional data-authenticity indicator with the additional test-data-authenticity-indicator.

17. The method of claim 16, wherein:
the provision data includes a next data-provision-device-authenticity-indicator, the next data-provision-device-authenticity-indicator being a function of a current data-provision-device-authenticity-indicator and a next data-provision-device-variable-number, the current data-provision-device-authenticity-indicator being a function of the current data-provision-device-variable-number and the initial authenticity-indicator; and the additional provision data includes:
   an additional next data-provision-device-authenticity-indicator; and
   an additional current data-provision-device-variable number; and
the method further comprises:
   setting the next data-provision-device-authenticity-indicator as the next data-receiving-device-authenticity-indicator;
   setting the next data-receiving-device-authenticity-indicator as a foregoing receiving-device-authenticity-indicator;
   setting the next data-receiving-device-authenticity-indicator as the current receiving-device-authenticity-indicator;
   setting the additional next data-receiving-device-authenticity-indicator as the next receiving-device-authenticity-indicator;
   setting the additional current data-receiving-device-variable number as the current data-provision-device-variable number;
   based on the comparing of the additional data-authenticity indicator with the additional test-data-authenticity;
      computing an additional test authenticity-indicator as a function of the foregoing receiving-device-authenticity-indicator and the current data-receiving-device-variable-number;
      comparing the current receiving-device-authenticity-indicator with the additional test authenticity-indicator; and
      accepting the additional message data based on the comparing of the current authenticity-indicator with the additional test authenticity-indicator.

18. The method of claim 15, further comprising:
receiving a current data-provision-device-authenticity-indicator from the data provision device; and
setting the current data-provision-device-authenticity-indicator as the current data-receiving-device-authenticity-indicator.

19. The method of claim 15, thither comprising generating the initial authenticity-indicator or receiving the initial authenticity-indicator from the data provision device in a secure way during an initialization operation.

20. The method of claim 15, further comprising calculating the current data-receiving-device-authenticity-indicator as a function of the current data-receiving-device-variable-number and the initial authenticity-indicator.

21. A data receiving device comprising:
a provision data receiving device to receive a message from a data provision device, the message including a provision data and a data-authenticity-indicator, the data-authenticity-indicator being a function of the provision data, the provision data including a current data-provision-device-variable-number and a message data;
a test-data-authenticity-indicator generating device to compute a test-data-authenticity-indicator as a function of the provision data; and
a comparing device to compare the data-authenticity indicator with the test-data-authenticity-indicator; and
wherein the data receiving device is further to:
   set an initial-authenticity-indicator as a foregoing receiving-device-authenticity-indicator;
   set the current data-provision-device-variable number as a current data-receiving-device-variable number; and based on the comparing of the data-authenticity indicator with the test-data-authenticity indicator the comparing device is further to:
compute a test authenticity-indicator as a function of the foregoing receiving-device-authenticity-indicator and the current data-receiving-device-variable-number;
compare a current receiving-device-authenticity-indicator with the test authenticity-indicator; and
accept the message data based on the comparing of the current authenticity-indicator with the test authenticity-indicator.

22. A computer program product, in particular stored on a computer-readabie storage medium which, when loaded on a data receiving device, carries out a method, the method comprising:
receiving a message, the message including provision data, the provision data including a message data, the message data including a program code; and
carrying out the program code based on an identification that the provision data came from an authorized data provision device and an identification that the provision data was not replaced or altered by a third party, wherein:
the message includes a data-authenticity indicator;
the identification that the provision data was not replaced or altered by a third party is based on a comparison between the data-authenticity-indicator and a test-data-authenticity-indicator, the test-data-authenticity indicator being a function of an indicator exchanged in a secure way between the data receiving device and the data provision before the receiving of the message;
the message is a first message;
the provision data includes a first variable-number; and
the identification that the provision data came from an authorized data provision device is based on a comparison of current authenticity-indicator and a test authenticity-indicator, the current-authenticity-indicator received before the sending of the first message during an initialization operation or as a next data-authenticity-indicator of a second message, the test authenticity-indicator being a function of a foregoing authenticity-indicator and the first variable-number, the foregoing authenticity-indicator received during an initialization operation or as a next data-authenticity-indicator of a third message, the second message preceding the first message by one, the third message preceding the first message by two.

23. The method of claim 1, wherein the provision data is not encrypted by the data provision device.

* * * * *